(12) United States Patent
Sawada et al.

(10) Patent No.: US 9,104,981 B2
(45) Date of Patent: Aug. 11, 2015

(54) ROBOT TEACHING SYSTEM AND METHOD USING IMAGING BASED ON TRAINING POSITION

(71) Applicant: KABUSHIKI KAISHA YASKAWA DENKI, Kitakyushu-shi (JP)

(72) Inventors: Yukiko Sawada, Kitakyushu (JP); Tomoyuki Sekiyama, Kitakyushu (JP); Kenichi Motonaga, Kitakyushu (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 267 days.

(21) Appl. No.: 13/831,792

(22) Filed: Mar. 15, 2013

(65) Prior Publication Data

US 2014/0201112 A1 Jul. 17, 2014

(30) Foreign Application Priority Data

Jan. 16, 2013 (JP) .................................. 2013-005480

(51) Int. Cl.
*G06F 15/18* (2006.01)
*G06N 99/00* (2010.01)
*G05B 19/427* (2006.01)

(52) U.S. Cl.
CPC ............ *G06N 99/005* (2013.01); *G05B 19/427* (2013.01); *Y10S 901/04* (2013.01)

(58) Field of Classification Search
None
See application file for complete search history.

(56) References Cited

U.S. PATENT DOCUMENTS

| 5,748,854 A | 5/1998 | Watanabe et al. |
| 2010/0076600 A1* | 3/2010 | Cross et al. ................... 700/259 |

FOREIGN PATENT DOCUMENTS

| EP | 1435280 B1 | 7/2004 |
| JP | 03-010125 B2 | 7/1985 |
| JP | 63-089278 | 4/1988 |
| JP | 06-102919 | 4/1994 |
| JP | 3160443 B2 | 5/1995 |
| JP | 08-001563 | 1/1996 |
| JP | 09-047989 | 2/1997 |
| JP | 09-225872 | 9/1997 |
| JP | 4817603 B2 | 7/2004 |
| JP | 2011-104759 | 6/2011 |
| JP | 2013071231 A * | 4/2013 |

OTHER PUBLICATIONS

Eppner et al. "Imitation Learning with Generalized Task Descriptions", ICRA, 2009, pp. 17.*
Japanese Office Action for corresponding JP Application No. 2013-005480, Dec. 17, 2013.

* cited by examiner

*Primary Examiner* — Li-Wu Chang
(74) *Attorney, Agent, or Firm* — Mori & Ward, LLP (57) ABSTRACT

This robot teaching system includes a teaching tool including an operation portion operated by a user to specify teaching positions and specifying the teaching positions, a measuring portion measuring positions and postures of the teaching tool, and a control portion determining the teaching positions for a robot. The robot teaching system is configured to specify the teaching positions continuously while the user operates the operation portion of the teaching tool.

19 Claims, 5 Drawing Sheets

ROBOT TEACHING SYSTEM AND METHOD USING IMAGING BASED ON TRAINING POSITION

CROSS-REFERENCE TO RELATED APPLICATIONS

The priority application number JP2013-005480, Robot Teaching System, Robot Teaching Method, and Teaching Tool, Jan. 16, 2013, Yukiko Sawada, Tomoyuki Sekiyama, and Kenichi Motonaga, upon which this patent application is based is hereby incorporated by reference.

BACKGROUND OF THE INVENTION

1. Field of the Invention

The present invention relates to a robot teaching system and a robot teaching method.

2. Description of the Background Art

Japanese Patent Laying-Open No. 2011-104759 discloses a robot control system including a teaching tool being located in teaching positions as the operating positions of a robot to specify the teaching positions, a stereo camera imaging the teaching tool located in the teaching positions, and a controller determining the teaching positions for the robot on the basis of the positions and postures of the teaching tool imaged by the stereo camera.

SUMMARY OF THE INVENTION

A robot teaching system according to a first aspect includes a teaching tool including an operation portion operated by a user to specify teaching positions and being located in the teaching positions as the operating positions of a robot to specify the teaching positions, a measuring portion measuring the positions and postures of the teaching tool in the teaching positions specified by the teaching tool, and a control portion determining the teaching positions for the robot on the basis of the positions and postures of the teaching tool measured by the measuring portion, and is configured to specify the teaching positions continuously while the user operates the operation portion of the teaching tool.

A robot teaching method according to a second aspect includes specifying teaching positions as the operating positions of a robot on the basis of that a user operates an operation portion of the teaching tool in a state where the teaching tool is located in the teaching positions, measuring the positions and postures of the teaching tool in the teaching positions specified by the teaching tool, and generating a teaching program for the robot by determining the teaching positions for the robot on the basis of the measured positions and postures of the teaching tool, while specifying the teaching positions includes specifying the teaching positions continuously while the user operates the operation portion, moving the teaching tool.

DESCRIPTION OF THE EMBODIMENTS

An embodiment is now described with reference to the drawings.

First, the structure of a robot teaching system 100 according to this embodiment is described with reference to FIGS. 1 to 4.

Figure 1:
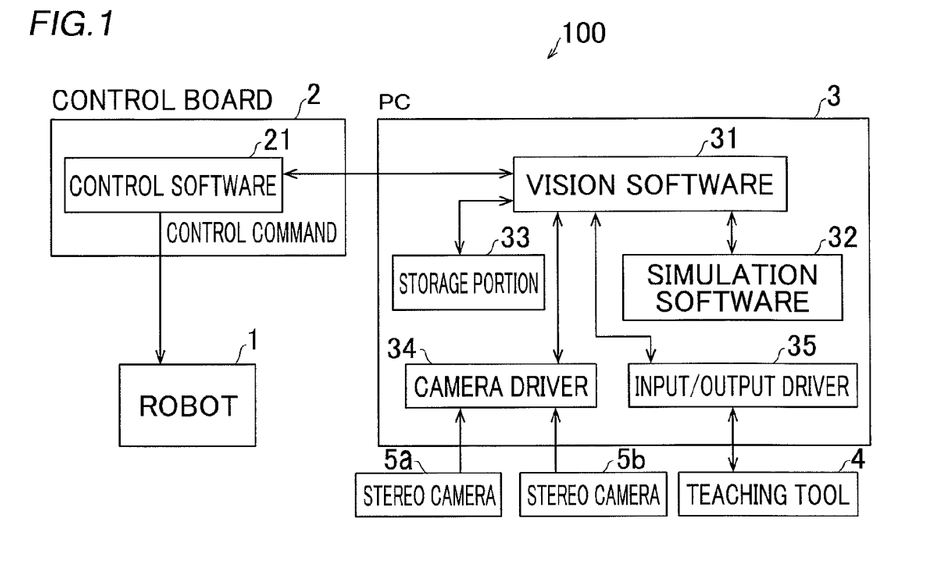
FIG. 1 is a block diagram showing the overall structure of a robot teaching system according to an embodiment.

As shown in FIG. 1, the robot teaching system 100 includes a robot 1, a control board (robot controller) 2, a PC (personal computer) 3, a teaching tool 4, and stereo cameras 5a and 5b. The robot 1 is connected to the control board 2. The PC 3 is connected with the control board 2 and the stereo cameras 5a and 5b by wired or wireless connections. The teaching tool 4 is connected to the PC 3 by a wired connection. The PC 3 is an example of the "control portion".

The control board 2 includes control software 21 as a control structure. The PC 3 includes vision software 31, simulation software 32, a storage portion 33, a camera driver 34, and an input/output driver 35 as a control structure.

Figure 2:
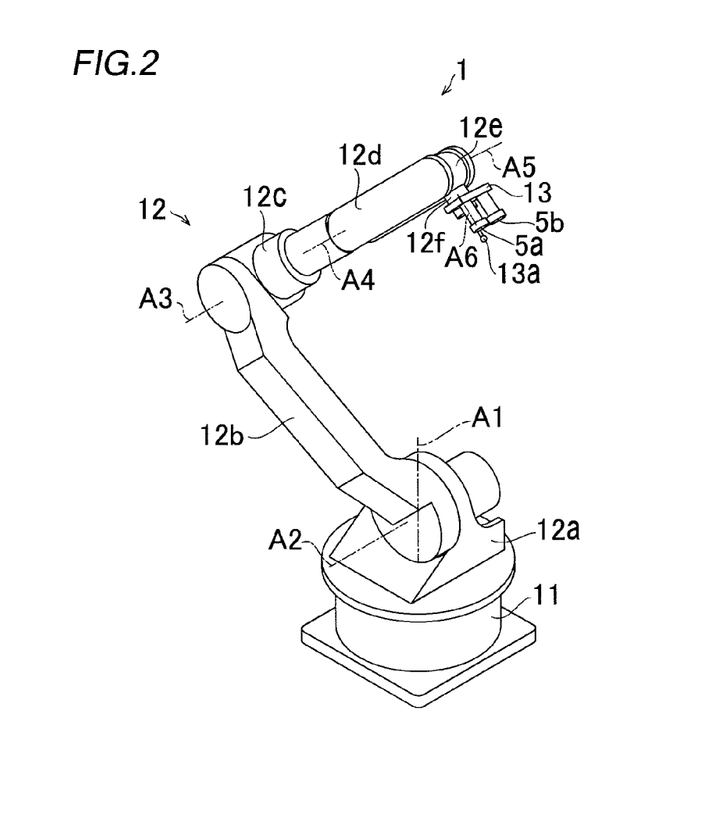
FIG. 2 is a perspective view showing a robot of the robot teaching system according to the embodiment.

As shown in FIG. 2, the robot 1 is a vertical articulated robot. The robot 1 includes a base 11, a robot arm 12 mounted on the base 11, and a tool 13a mounted on an end of the robot arm 12. The robot arm 12 has six degrees of freedom. A flange 13 having a mounting portion to mount the tool 13a is formed on the end of the robot arm 12.

The robot arm 12 has a plurality of arm structures, and an arm structure 12a is coupled to the base 11 to be rotatable about a rotation axis A perpendicular to the installation surface of the robot 1. An arm structure 12b is coupled to the arm structure 12a to be rotatable about a rotation axis A2 perpendicular to the rotation axis A1. An arm structure 12c is coupled to the arm structure 12b to be rotatable about a rotation axis A3 parallel to the rotation axis A2. An arm structure 12d is coupled to an arm structure 12c to be rotatable about a rotation axis A4 perpendicular to the rotation axis A3. An arm structure 12e is coupled to the arm structure 12d to be rotatable about a rotation axis A5 perpendicular to the rotation axis A4. An arm structure 12f is coupled to the arm structure 12e to be rotatable about a rotation axis A6 perpendicular to the rotation axis A5.

Terms such as "parallel", "perpendicular", "vertical", and "horizontal" in this description mean not only in a strict sense but also slightly deviating from "parallel", "perpendicular", "vertical", and "horizontal" in a wider sense. Servomotors are provided on the respective rotation axes A1 to A6, and the servomotors have encoders detecting the rotation positions thereof. The servomotors are connected to the control board 2 and are configured to operate on the basis of control commands of the control software 21 of the control board 2.

As shown in FIG. 2, the flange 13 is mounted on the arm structure 12f of the robot arm 12. On the flange 13, the tool 13a performing an operation on a workpiece 6 (see FIG. 3) is mounted. On the flange 13, a pair of stereo cameras 5a and 5b imaging the teaching tool 4 are mounted.

The control board 2 is configured to control the overall operation of the robot 1. Specifically, the control board 2 is configured to output a control command from the control software 21 to the robot 1 on the basis of a teaching program for the robot 1 generated by the PC 3 to control the operation of the robot 1.

According to this embodiment, the PC 3 is configured to image the teaching tool 4 in teaching positions specified by the teaching tool 4 with the stereo cameras 5a and 5b on the basis of that a user (operator) operates a teaching button 43 (see FIG. 4), described later, of the teaching tool 4 in a state where the teaching tool 4 is located in the teaching positions. Furthermore, the PC 3 is configured to generate the teaching program for the robot 1 by determining the teaching positions for the robot 1 on the basis of the positions and postures of the imaged teaching tool 4.

The vision software 31 is configured to generate the teaching program for the robot 1. Specifically, the vision software 31 is configured to measure the teaching positions of the teaching program in response to measurement requests of the control software 21 of the control board 2 to generate the teaching program for the robot 1. Furthermore, the vision software 31 is configured to control the pair of stereo cameras 5a and 5b through the camera driver 34 to image the teaching tool 4 in the teaching positions specified by the teaching tool 4. In addition, the vision software 31 is configured to accept an operation performed by the user on the teaching tool 4 through the input/output driver 35 and control processing for specifying the teaching positions of the teaching tool 4.

The vision software 31 is configured to interpolate between the teaching positions specified by the teaching tool 4 to generate the teaching program for the robot 1. Specifically, the vision software 31 is configured to interpolate between the teaching positions specified by the teaching tool 4 by linear interpolation (MOVL), link interpolation (MOVJ), or circular interpolation (MOVC). Furthermore, the vision software 31 is configured to determine the operation speed of the robot 1 and an interpolation method for movement between the teaching positions depending on the teaching positions belonging to work zones of the robot 1 and the teaching positions belonging to non-work zones of the robot 1. The work zones are zones in which the robot 1 is moved while the tool 13a performs an operation on the workpiece 6, and the non-work zones are zones in which the tool 13a does not perform an operation, such as zones in which the robot 1 is moved between the work zones. In addition, the vision software 31 is configured to perform control of notifying the user of a result of determination whether or not the robot 1 is movable to positions and postures corresponding to the positions and postures of the teaching tool 4 with an OK notification light 44a, an NG notification light 44b, a warning notification light 44c, and an imaging NG notification light 44d (see FIG. 4), described later, of the teaching tool 4.

The simulation software 32 is configured to perform a simulation on the basis of a command of the vision software 31. Furthermore, the simulation software 32 is configured to perform a simulation and determine whether or not the robot 1 is movable to the positions and the postures corresponding to the positions and postures of the teaching tool 4. In addition, the simulation software 32 is configured to perform a simulation and determine whether or not the robot 1 is movable through a movement path interpolating between the teaching positions specified by the teaching tool 4. Moreover, the simulation software 32 is configured to output a result of determination whether or not the robot 1 is movable to the positions and the postures corresponding to the positions and postures of the teaching tool 4 and a result of determination whether or not the robot 1 is movable through the movement path interpolating between the teaching positions specified by the teaching tool 4 to the vision software 31. Also, the simulation software 32 is configured to simulate the operation of the robot 1 on the basis of the generated teaching program for the robot 1. The storage portion 33 stores teaching position information specified by the teaching tool 4.

Figure 3:
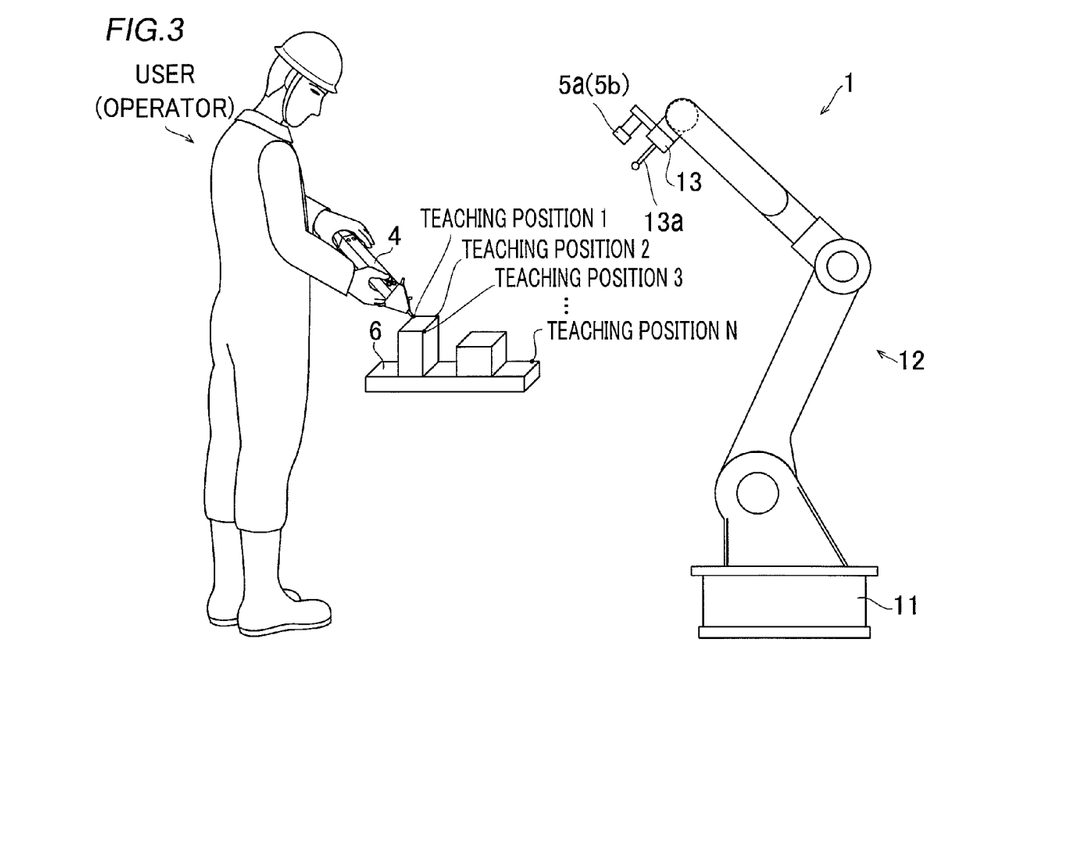
FIG. 3 illustrates teaching control of the robot teaching system according to the embodiment.
Figure 4:
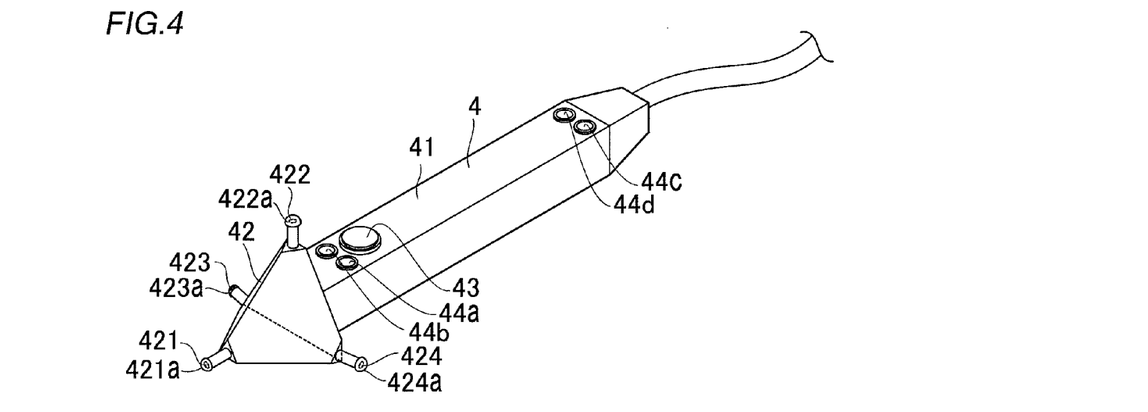
FIG. 4 illustrates a teaching tool of the robot teaching system according to the embodiment.

According to this embodiment, the teaching tool 4 is configured to be located in the teaching positions as the operating positions of the robot 1 to specify the teaching positions, as shown in FIG. 3. In addition, the teaching tool 4 includes a grasp portion 41 grasped by the user and a regular tetrahedral teaching portion 42 teaching the positions and postures of the robot 1, as shown in FIG. 4. On the grasp portion 41, the teaching button 43 operated by the user to specify the teaching positions, the OK notification light 44a, the NG notification light 44b, the warning notification light 44c, and the imaging NG notification light 44d are arranged. The teaching button 43 is an example of the "operation portion" or the "teaching operation portion". The OK notification light 44a, the NG notification light 44b, the warning notification light 44c, and the imaging NG notification light 44d are examples of the "notification portion". The OK notification light 44a and the NG notification light 44b are examples of the "first visual notification portion", and the warning notification light 44c is an example of the "second visual notification portion".

The OK notification light 44a and the NG notification light 44b are configured to notify the user so that the user can visually recognize whether or not the robot 1 is movable to the positions and the postures corresponding to the positions and postures of the teaching tool 4. Specifically, when the robot 1 is movable to the positions and the postures corresponding to the positions and postures of the teaching tool 4, the OK notification light 44a glows blue for notification. When the robot 1 is not movable to the positions and the postures corresponding to the positions and postures of the teaching tool 4, the NG notification light 44b glows red for notification.

The warning notification light 44c is configured to notify the user so that the user can visually recognize whether or not the robot 1 is movable through the movement path interpolating between the teaching positions specified by the teaching tool 4. Specifically, when the robot 1 is not movable through the movement path interpolating between the teaching positions specified by the teaching tool 4, the warning notification light 44c glows yellow for notification. The imaging NG notification light 44d blinks in red for notification when the stereo cameras 5a and 5b can image only two or less of infrared LEDs 421, 422, 423, and 424, described later, of the teaching portion 42. In other words, when the stereo cameras 5a and 5b cannot recognize the teaching positions and postures of the teaching tool 4, the imaging NG notification light 44d blinks in red.

The infrared LEDs 421, 422, 423, and 424 being distinguishable from each other by sequentially emitting light are so mounted on the teaching portion 42 that the same are arranged on the vertices of the regular tetrahedron, respectively. Light diffusion caps 421a, 422a, 423a, and 424a are mounted on the infrared LEDs 421, 422, 423, and 424 of the teaching portion 42, respectively. The infrared LEDs 421 to 424 are examples of the "sign portion" or the "light-emitting element".

According to this embodiment, the teaching tool 4 is configured to specify the teaching positions continuously while the user operates the teaching button 43. Specifying the teaching positions continuously includes not only specifying the teaching positions so that the teaching positions are continuously connected to each other but also specifying the teaching positions continually. Furthermore, the teaching tool 4 is configured to be operable to switch between a mode of specifying the teaching positions one by one and a mode of specifying the teaching positions continuously while the teaching tool 4 moves on the basis of an operation performed by the user on the teaching button 43.

Specifically, the teaching tool 4 is configured to switch to the mode of specifying the teaching positions continuously while the teaching tool 4 moves by doing a long press (a long press for two or more seconds, for example) of the teaching button 43. Furthermore, the teaching tool 4 is configured to switch to the mode of specifying the teaching positions one by one by doing a short press (for less than two seconds, for example) of the teaching button 43. In addition, the teaching tool 4 is configured to specify the teaching positions one by one each time the user presses down the teaching button 43 and to specify the teaching positions continuously while the user continuously presses down the teaching button 43, moving the teaching tool 4.

The teaching tool 4 is configured to be capable of specifying the teaching positions in a state of distinguishing the work zones of the robot 1 from the non-work zones thereof on the basis of an operation performed by the user on the teaching button 43. Specifically, the teaching tool 4 is configured to distinguish the work zones of the robot 1 from the non-work zones thereof by a double click of the teaching button 43 by the user.

The stereo cameras 5*a* and 5*b* are configured to be capable of recognizing the three-dimensional position of the teaching tool 4 by associating images of the teaching tool 4 imaged by the two cameras with each other with the vision software operated by a built-in control apparatus (not shown). The stereo cameras 5*a* and 5*b* are configured to image the teaching tool 4 in the teaching positions specified by the teaching tool 4. In other words, the stereo cameras 5*a* and 5*b* are configured to image infrared light sequentially emitted from the infrared LEDs 421, 422, 423, and 424 of the teaching tool 4 to recognize the teaching positions and postures of the teaching tool 4. The stereo cameras 5*a* and 5*b* are examples of the "measuring portion" or the "imaging portion".

The stereo cameras 5*a* and 5*b* image the teaching tool 4 each time the user presses down the teaching button 43. Furthermore, the stereo cameras 5*a* and 5*b* are configured to image the teaching tool 4 continuously when the user moves the teaching tool 4, keeping pressing down the teaching button 43.

Figure 5:
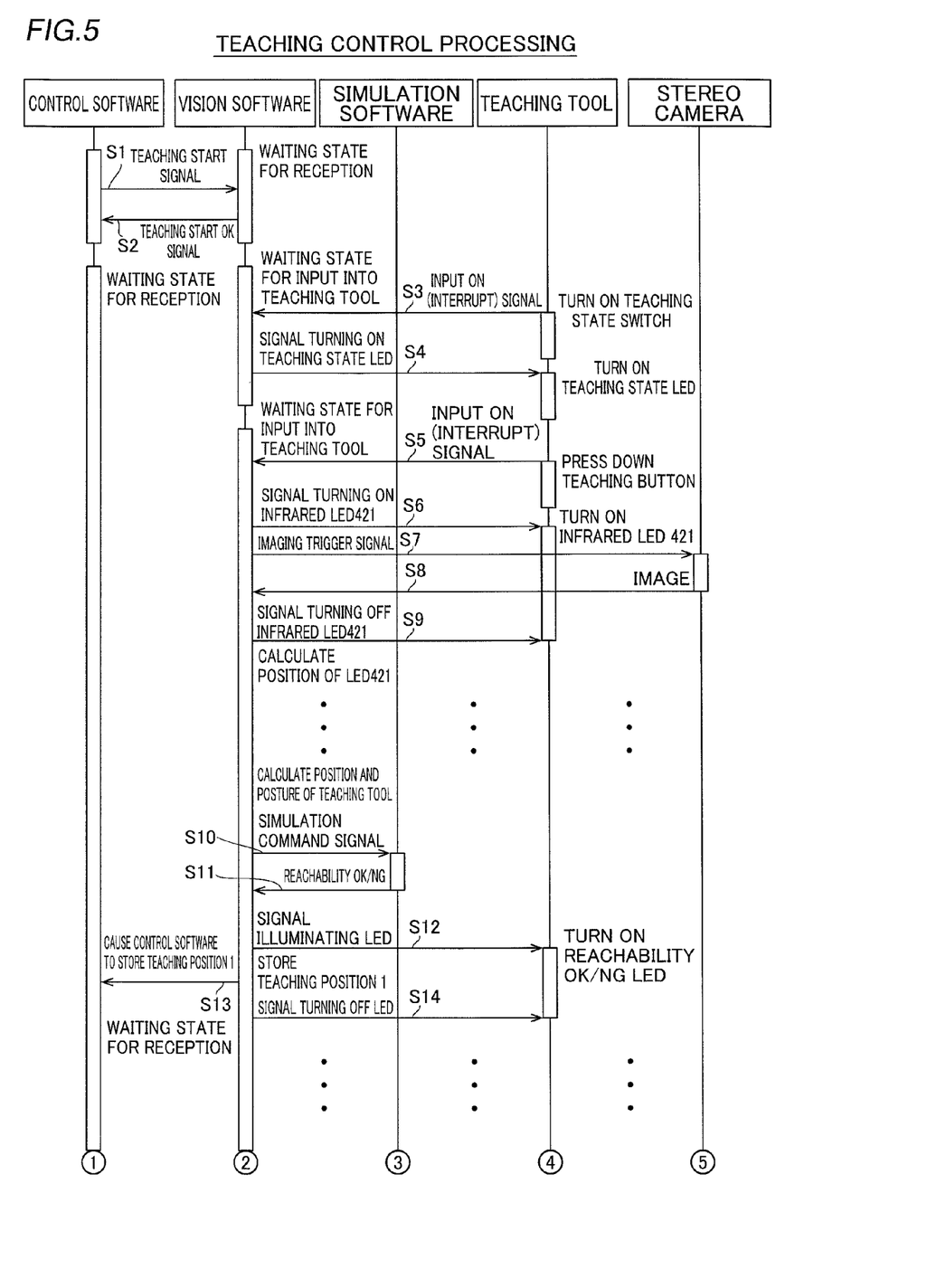
FIG. 5 is a first flowchart for illustrating teaching control processing in the robot teaching system according to the embodiment.

Second, teaching control processing performed by the control software 21 of the control board 2 of the robot teaching system 100 and the vision software 31 and the simulation software 32 of the PC 3 is described with reference to FIGS. 5 and 6.

When the user performs a teaching start operation on the control software 21, the control software 21 transmits a teaching start signal to the vision software 31 in a waiting state for receiving a signal at a step S1. The vision software 31 having received the teaching start signal transmits a teaching start OK signal to the control software 21 at a step S2. Thereafter, the control software 21 enters a waiting state for receiving a signal from the vision software 31. In addition, the vision software 31 enters an input waiting state of waiting until the user operates the teaching button 43 of the teaching tool 4 to specify the teaching positions.

When the user turns on a teaching state switch (not shown) at a step S3, an input ON (interrupt) signal is transmitted from the teaching tool 4 to the vision software 31. At a step S4, the vision software 31 transmits a signal turning on a teaching state LED (not shown) to the teaching tool 4. The teaching tool 4 having received this signal turning on the teaching state LED turns on the teaching state LED. Thus, the teaching tool 4 starts processing for specifying the teaching positions for the robot 1.

When the user presses down the teaching button 43 of the teaching tool 4 located in the teaching positions, an input ON (interrupt) signal is transmitted from the teaching tool 4 to the vision software 31 at a step S5. While the user operates (presses down) this teaching button 43, the teaching positions are specified continuously.

At a step S6, the vision software 31 transmits a signal turning on the infrared LED 421 to the teaching tool 4. The teaching tool 4 having received this signal turning on the infrared LED 421 turns on the infrared LED 421 so as to cause the infrared LED 421 to output infrared light. At a step S7, the vision software 31 transmits an imaging trigger signal to cause the stereo cameras 5*a* and 5*b* to perform imaging. After the stereo cameras 5*a* and 5*b* perform imaging, two images imaged by the stereo cameras 5*a* and 5*b* are transmitted to the vision software 31 at a step S8. At a step S9, the vision software 31 transmits a signal turning off the infrared LED 421 to the teaching tool 4. The teaching tool 4 having received this signal turning off the infrared LED 421 turns off the infrared LED 421. The processing at the steps S6 to S9 is similarly performed for the infrared LEDs 422 to 424. Thus, imaging processing in one teaching position is terminated.

Thereafter, the vision software 31 calculates the teaching positions and postures of the teaching tool 4. In other words, the vision software 31 calculates the three-dimensional position of the teaching portion 42 of the teaching tool 4 on the basis of the positions of the infrared LEDs 421 to 424 imaged by the stereo cameras 5*a* and 5*b* and recognizes the teaching positions and postures of the teaching tool 4. The regular tetrahedral shape of the teaching portion 42 can be reproduced in three-dimensional space if three or more of the infrared LEDs 421 to 424 can be imaged, and hence the teaching positions and postures of the teaching tool 4 can be calculated.

At a step S10, the vision software 31 transmits a simulation command signal to the simulation software 32. The simulation software 32 having received this simulation command signal simulates whether or not the robot 1 is movable (reachable) to the positions and the postures corresponding to the teaching positions and postures of the teaching tool 4. In addition, the simulation software 32 simulates whether or not the robot 1 is movable through the movement path interpolating between the teaching positions. The simulation software 32 transmits simulation results (reachability OK/NG) to the vision software 31 at a step S11.

At a step S12, the vision software 31 transmits a signal illuminating the OK notification light 44*a*, the NG notification light 44*b*, the warning notification light 44*c*, or the imaging NG notification light 44*d* of the teaching tool 4 on the basis of the simulation results (reachability OK/NG). When the robot 1 is movable, the vision software 31 stores a teaching position 1 and causes the control software 21 to store the teaching position 1 at a step S13. At a step S14, the vision software 31 transmits a signal turning off the illuminated notification light of the teaching tool 4 to the teaching tool 4 at a step S14.

The processing at the steps S3 to S14 is similarly performed for a teaching position 2 to a teaching position N. In other words, the teaching position specified by the teaching tool 4 is moved, and the processing at the steps S3 to S14 is repeated.

Figure 6:
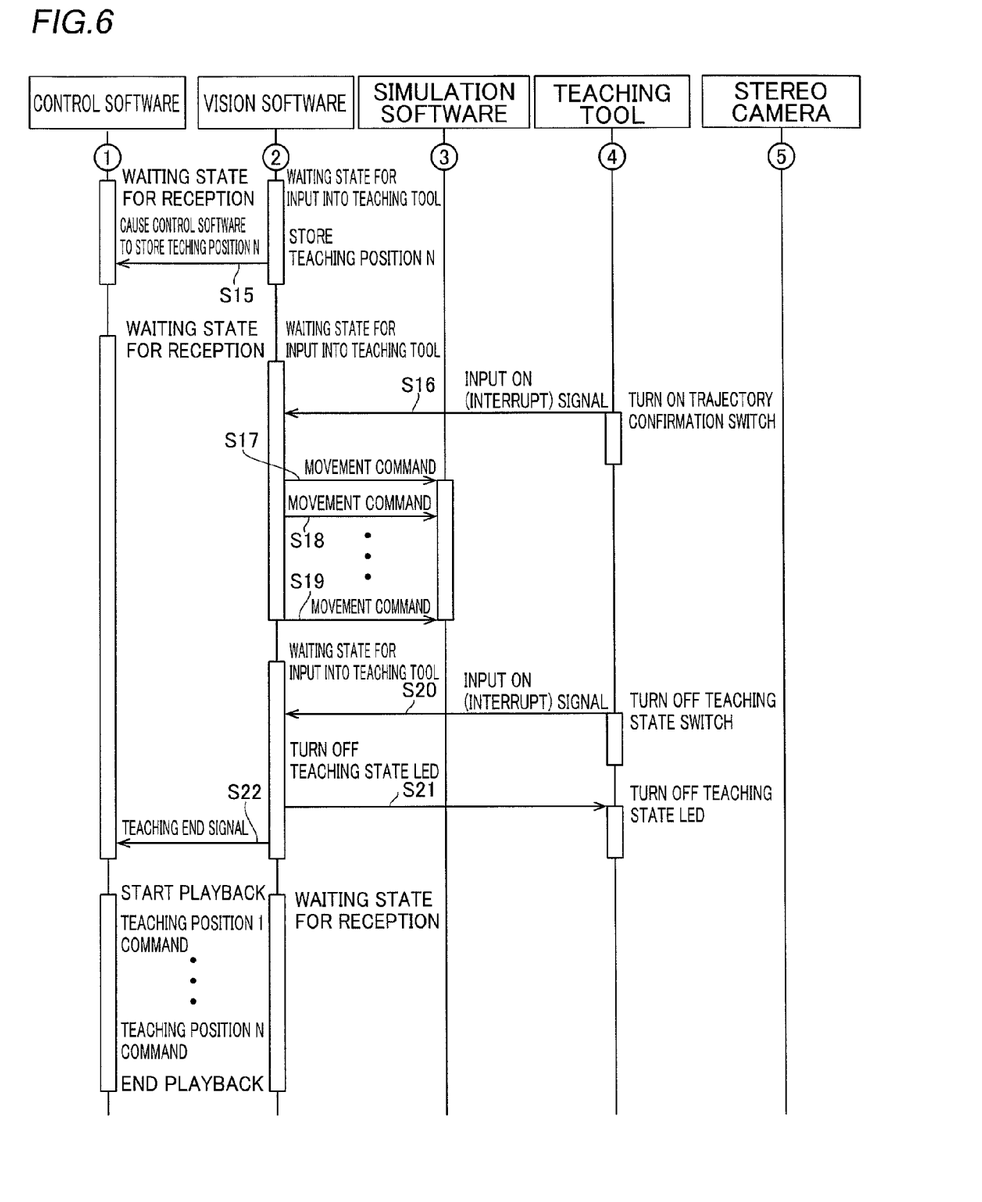
FIG. 6 is a second flowchart for illustrating the teaching control processing in the robot teaching system according to the embodiment.

At a step S15 in FIG. 6, the vision software 31 stores the teaching position N and causes the control software 21 to store the teaching position N. Thus, all the teaching positions (the teaching position 1 to the teaching position N) have been specified by the teaching tool 4.

When the user turns on a trajectory confirmation switch (not shown) of the teaching tool 4, an input ON (interrupt) signal is transmitted from the teaching tool 4 to the vision software 31 at a step S16. At steps S17 to S19, the vision software 31 transmits movement commands to the simulation software 32 and causes the simulation software 32 to perform a simulation of moving the robot 1 to correspond to the teaching position 1 to the teaching position N. At this time, a result of the simulation of moving the robot 1 is displayed on a display portion (not shown) of the PC 3.

When the user turns off the teaching state switch (not shown), an input ON (interrupt) signal is transmitted from the teaching tool 4 to the vision software 31 at a step S20. At a step S21, the vision software 31 transmits a signal turning off the teaching state LED (not shown) to the teaching tool 4. The teaching tool 4 having received this signal turning off the teaching state LED turns off the teaching state LED. Thus, the processing for specifying the teaching positions for the robot 1 by the teaching tool 4 is terminated. Then, the specified teaching positions are input into the teaching program, whereby the teaching program is generated.

Thereafter, the control software 21 transmits a teaching position 1 command to a teaching position N command to the robot 1. In other words, the robot 1 is played back on the basis of the teaching program and is moved actually.

According to this embodiment, as hereinabove described, the teaching tool 4 is provided with the teaching button 43 operated by the user to specify the teaching positions. Thus, it is not necessary to operate a teaching pendant provided separately from the teaching tool 4 each time the teaching positions are specified, and hence increase in an operation burden on the user can be suppressed when the user specifies the teaching positions for the robot 1 with the teaching tool 4. Furthermore, a teaching operation can be performed in a state where the servos of the servomotors of the robot 1 are OFF without moving the robot 1 actually with the teaching pendant, and hence the user can perform the operation more safely. In addition, the robot teaching system 100 is configured to specify the teaching positions continuously while the user operates the teaching button 43 of the teaching tool 4. Thus, the user can continuously specify the teaching positions for the robot 1 by operating the teaching button 43 provided on the teaching tool 4 without operating the teaching pendant provided separately from the teaching tool 4 each time the user specifies the teaching positions, and hence increase in an operation burden on the user can be effectively suppressed.

According to this embodiment, as hereinabove described, the teaching tool 4 is configured to be operable to switch between the mode of specifying the teaching positions one by one and the mode of specifying the teaching positions continuously while the teaching tool 4 moves on the basis of an operation performed by the user on the teaching button 43. Thus, a burden on the user can be reduced by interpolating between the teaching positions when the teaching positions are specified one by one while the teaching positions (the movement path of the robot) can be specified specifically when the teaching positions are specified continuously.

According to this embodiment, as hereinabove described, the teaching tool 4 is configured to specify the teaching positions one by one each time the user presses down the teaching button 43 and to specify the teaching positions continuously while the user continuously presses down the teaching button 43, moving the teaching tool 4, and the stereo cameras 5a and 5b are configured to image the teaching tool 4 each time the user presses down the teaching button 43 and to image the teaching tool 4 continuously while the user continuously presses down the teaching button 43, moving the teaching tool 4. Thus, when the teaching positions are specified one by one, the teaching tool 4 is imaged each time the user presses down the teaching button 43, and hence the teaching tool 4 is not imaged while moving between the teaching positions so that the imaging processing can be simplified. When the teaching positions are specified continuously, the teaching tool 4 is imaged continuously while the user continuously presses down the teaching button 43, and hence it is not necessary for the user to repeatedly press the teaching button 43 for imaging. Thus, a burden on the user can be reduced.

According to this embodiment, as hereinabove described, the PC 3 is configured to determine whether or not the robot 1 is movable to the positions and the postures corresponding to the positions and postures of the teaching tool 4 and perform control of notifying the user of the determination result with the OK notification light 44a, the NG notification light 44b, the warning notification light 44c, and the imaging NG notification light 44d of the teaching tool 4. Thus, the user can immediately confirm whether or not the robot 1 is movable to the positions and the postures corresponding to the specified teaching positions and the postures of the teaching tool 4 by the notification of the OK notification light 44a, the NG notification light 44b, the warning notification light 44c, and the imaging NG notification light 44d of the teaching tool 4 operated by the user each time the teaching tool 4 specifies the teaching positions, and hence a teaching operation performed by the user can be efficiently performed. Thus, a burden of a teaching operation on the user can be reduced.

According to this embodiment, as hereinabove described, the OK notification light 44a and the NG notification light 44b of the teaching tool 4 are configured to notify the user so that the user can visually recognize whether or not the robot 1 is movable to the positions and the postures corresponding to the positions and postures of the teaching tool 4. Thus, the user can easily recognize whether or not the robot 1 is movable to the positions and the postures corresponding to the positions and postures of the teaching tool 4 through the user's visual sense.

According to this embodiment, as hereinabove described, the PC 3 is configured to determine whether or not the robot 1 is movable through the movement path interpolating between the teaching positions specified by the teaching tool 4 and perform control of notifying the user of the determination result with the warning notification light 44c of the teaching tool 4. Thus, the user can immediately confirm whether or not the robot 1 is movable through the movement path interpolating between the teaching positions by the notification of the warning notification light 44c of the teaching tool 4 operated by the user, and hence a teaching operation performed by the user can be efficiently performed.

According to this embodiment, as hereinabove described, the warning notification light 44c of the teaching tool 4 is configured to notify the user so that the user can visually recognize whether or not the robot 1 is movable through the movement path interpolating between the teaching positions specified by the teaching tool 4. Thus, the user can easily recognize whether or not the robot 1 is movable through the movement path interpolating between the teaching positions through the user's visual sense.

According to this embodiment, as hereinabove described, the teaching tool 4 is configured to be capable of specifying the teaching positions in the state of distinguishing the work zones of the robot 1 from the non-work zones thereof on the basis of an operation performed by the user on the teaching button 43. Thus, the teaching positions are specified in the state where the work zones of the robot 1 are distinguished from the non-work zones thereof, and hence teaching suitable for the operation of the robot 1 can be easily performed.

According to this embodiment, as hereinabove described, the PC 3 is configured to determine the operation speed of the robot 1 and the interpolation method for movement between the teaching positions depending on the teaching positions belonging to the work zones of the robot 1 and the teaching positions belonging to the non-work zones of the robot 1. Thus, the operation speed of the robot 1 and the interpolation method for movement between the teaching positions being more suitable for the operation of the robot 1 can be determined.

According to this embodiment, as hereinabove described, a plurality of infrared LEDs 421 to 424 being distinguishable from each other are so provided that the same are arranged on the vertices of the tetrahedral teaching portion 42, respectively. Thus, the infrared LEDs 421 to 424 arranged on the vertices of the tetrahedral teaching portion 42, respectively, are imaged by the stereo cameras 5a and 5b, whereby the teaching positions and postures of the teaching tool 4 can be easily acquired.

According to this embodiment, as hereinabove described, the PC 3 is configured to sequentially emit light from the plurality of infrared LEDs 421 to 424 of the teaching portion 42 and image the teaching positions taught by the teaching portion 42 with the stereo cameras 5a and 5b. Thus, the infrared LEDs 421 to 424 arranged on the vertices of the tetrahedral teaching portion 42 can be distinguished individually, and hence the teaching positions and postures of the teaching tool 4 can be accurately acquired.

According to this embodiment, as hereinabove described, the light diffusion caps 421a to 424a are mounted on the plurality of infrared LEDs 421 to 424 of the teaching portion 42, respectively. Thus, infrared light output from the infrared LEDs 421 to 424 can be diffused, and hence the stereo cameras 5a and 5b can reliably image the infrared light output from the infrared LEDs 421 to 424 regardless of the posture of the teaching portion 42.

According to this embodiment, as hereinabove described, the plurality of infrared LEDs 421 to 424 are configured to output infrared light, and the stereo cameras 5a and 5b are configured to receive the infrared light output from the plurality of infrared LEDs 421 to 424 to perform imaging. Thus, the infrared light from the infrared LEDs 421 to 424 can be recognized without being influenced by visible light, and hence the teaching positions and postures of the teaching tool 4 can be accurately acquired.

According to this embodiment, as hereinabove described, the teaching portion 42 has a regular tetrahedral shape. Thus, the teaching portion 42 is formed in a balanced manner, so that the teaching positions and postures of the teaching tool 4 can be easily recognized.

It should be understood by those skilled in the art that various modifications, combinations, sub-combinations, and alterations may occur depending on design requirements and other factors insofar as they are within the scope of the appended claims or the equivalents thereof.

Figure 7:
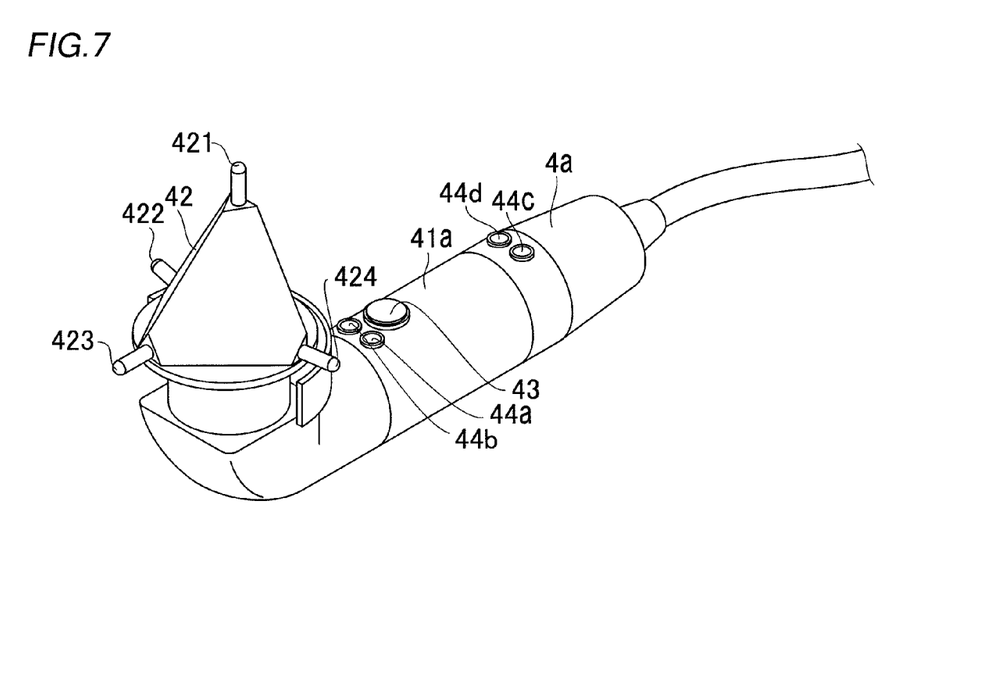
FIG. 7 is a perspective view showing a first modification of the teaching tool of the robot teaching system according to the embodiment.
Figure 8:
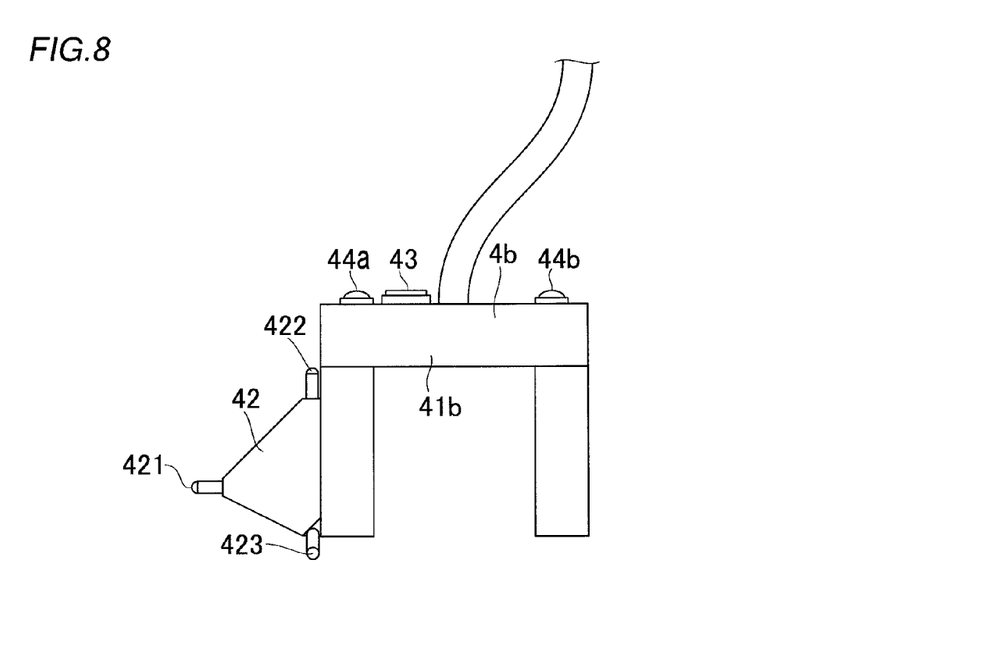
FIG. 8 illustrates a second modification of the teaching tool of the robot teaching system according to the embodiment.

For example, the grasp portion of the teaching tool may alternatively be formed in a tool shape appropriate for an operation performed by the robot. Specifically, a grasp portion 41a of a teaching tool 4a may be in the form of a grinder performing grinding, and a teaching portion 42 may be formed on a portion corresponding to a portion performing grinding as in a first modification shown in FIG. 7. Furthermore, a grasp portion 41b of a teaching tool 4b may be in the form of a hand of a robot 1 performing an operation as in a second modification shown in FIG. 8. Thus, the positions and postures of the tool performing an operation actually can be specified more specifically.

While the robot arm of the robot has six degrees of freedom in the aforementioned embodiment, the robot arm may alternatively have degrees of freedom (five degrees of freedom, seven degrees of freedom, etc.) other than six degrees of freedom, for example. Furthermore, the robot is not restricted to a so-called vertical articulated robot as in the aforementioned embodiment, but a horizontal articulated robot in which the rotation axes of movable portions are parallel to each other, a parallel link robot (delta robot), or the like may alternatively be employed.

While both the operation speed of the robot and the interpolation method for movement between the teaching positions are determined depending on the teaching positions belonging to the work zones of the robot and the teaching positions belonging to the non-work zones of the robot in the aforementioned embodiment, at least one of the operation speed of the robot and the interpolation method for movement between the teaching positions may alternatively be determined depending on the teaching positions belonging to the work zones of the robot and the teaching positions belonging to the non-work zones of the robot, for example. Furthermore, the robot teaching system may be so configured that the user can change the interpolation method, the operation speed, and continuity/discontinuity with input buttons or the like provided on the teaching tool. In addition, the robot teaching system may be configured to have functions of changing already stored information (teaching points) of the teaching positions, cancelling the teaching points, and so on.

While the notification lights notifying the user so that the user can take visual cognizance are employed as the notification portion in the aforementioned embodiment, the notification portion may alternatively be configured to notify the user with a sound, by vibration, or the like, for example. In addition, the notification portion may alternatively include a display portion such as a liquid crystal display.

While the teaching portion of the teaching tool has a regular tetrahedral shape in the aforementioned embodiment, the teaching portion may alternatively have a shape other than the regular tetrahedral shape, for example. The teaching portion may be in the form of a triangular pyramid or a polygonal pyramid other than a triangular pyramid, for example.

While the teaching tool is connected to the PC (control portion) by a wired connection in the aforementioned embodiment, the teaching tool may alternatively be connected to the control portion by a wireless connection, for example. The control portion is not restricted to the PC, but a computing unit such as a PLC or a robot controller may alternatively be employed.

While the infrared LEDs are employed as the sign portion in the aforementioned embodiment, LEDs emitting visible light may alternatively be employed as the sign portion, or light-emitting elements other than LEDs may alternatively be employed as the sign portion, for example. In addition, markers or the like may be employed as the sign portion so far as the same are distinguishable from each other.

While processing operations of the control portion are described by using the flowchart described in a flow-driven manner in which processing is performed in order along a processing flow for the convenience of illustration in the aforementioned embodiment, the processing operations of the control portion may alternatively be performed in an event-driven manner in which processing is performed on an event basis. In this case, the processing operations of the control portion may be performed in a complete event-driven manner or in a combination of an event-driven manner and a flow-driven manner.

While the stereo cameras (imaging portion or measuring portion) are mounted on the robot in the aforementioned embodiment, the imaging portion (measuring portion) may alternatively be provided separately from the robot, for example. Furthermore, even if the imaging portion (measuring portion) is mounted on the robot, the mounting location of the imaging portion (measuring portion) is not restricted to a mounting location in the embodiment, but the imaging portion (measuring portion) may be mounted on an intermediate portion of the robot arm.

While the stereo cameras are employed as the measuring portion in the aforementioned embodiment, a device of another system not accompanied with optical imaging may alternatively be employed so far as the same can measure the positions and postures of the teaching tool corresponding to the degrees of freedom of the taught robot and acquire the positions and postures of the teaching tool in the teaching positions specified by the teaching tool as the measuring portion, for example. The measuring portion may be configured by incorporating a compound sensor such as an acceleration sensor or a gyro sensor into the teaching tool, for example.

What is claimed is:

1. A robot teaching system comprising:
   a teaching tool including an operation portion operated by a user to specify teaching positions and being located in positions as operating positions of a robot to specify the teaching positions;
   a measuring portion measuring positions and postures of the teaching tool in the teaching positions specified by the teaching tool; and
   a control portion determining the teaching positions for the robot on the basis of the positions and postures of the teaching tool measured by the measuring portion,
   wherein the robot teaching system js configured to specify the teaching positions continuously while the user operates the operation portion of the teaching tool, and
   wherein the measuring portion includes an imaging portion imaging the teaching tool in the teaching positions specified by the teaching tool so that the positions and the postures of the teaching tool can be recognized, the postures being respective orientations of the teaching tool at the positions.

2. The robot teaching system according to claim 1, wherein the teaching tool is configured to be operable to switch between a mode of specifying the teaching positions and a mode of specifying the teaching positions continuously while the teaching tool moves on the basis of an operation performed by the user on the operation portion.

3. The robot teaching system according to claim 2, wherein the operation portion of the teaching tool includes a teaching operation portion,
   the teaching tool is configured to specify the teaching positions each time the user operates the teaching operation portion and to specify the teaching positions continuously while the user continuously operates the teaching operation portion, moving the teaching tool, and
   the measuring portion is configured to measure the positions and postures of the teaching tool in the teaching positions specified by the teaching tool each time the user operates the teaching operation portion and to measure the positions and postures of the teaching tool in the teaching positions continuously while the user continuously operates the teaching operation portion, moving the teaching tool.

4. A robot teaching system comprising:
   a teaching tool including an operation portion operated by a user to specify teaching positions and being located in positions as operating positions of a robot to specify the teaching positions;
   a measuring portion measuring positions and postures of the teaching tool in the teaching positions specified by the teaching tool; and
   a control portion determining the teaching positions for the robot on the basis of the positions and postures of the teaching tool measured by the measuring portion, the postures being respective orientations of the teaching tool at the positions,
   wherein the robot teaching system is configured to specify the teaching positions continuously while the user operates the operation portion of the teaching tool,
   wherein the teaching tool includes a notification portion, and
   wherein the control portion is configured to determine whether or not the robot is movable to positions and postures corresponding to the positions and postures of the teaching tool and perform control of notifying the user of a determination result with the notification portion of the teaching tool.

5. The robot teaching system according to claim 4, wherein the notification portion of the teaching tool has a first visual notification portion notifying the user so that the user can visually recognize whether or not the robot is movable to the positions and the postures corresponding to the positions and postures of the teaching tool.

6. The robot teaching system according to claim 4, wherein the control portion is configured to determine whether or not the robot is movable through a movement path interpolating between the teaching positions specified by the teaching tool and perform control of notifying the user of a determination result with the notification portion of the teaching tool.

7. The robot teaching system according to claim 6, wherein the notification portion of the teaching tool has a second visual notification portion notifying the user so that the user can visually recognize whether or not the robot is movable through the movement path interpolating between the teaching positions specified by the teaching tool.

8. The robot teaching system according to claim 1, wherein the teaching tool is configured to specify the teaching positions in a state of distinguishing a work zone of the robot from a non-work zone thereof on the basis of an operation performed by the user on the operation portion.

9. The robot teaching system according to claim 8, wherein the control portion is configured to determine at least one of an operation speed of the robot and an interpolation method for movement between the teaching positions depending on the teaching positions belonging to the work zone of the robot and the teaching positions belonging to the non-work zone of the robot.

10. The robot teaching system according to claim 1, wherein
    the teaching tool further includes a grasp portion grasped by the user and a tetrahedral teaching portion teaching positions and postures of the robot, and
    the teaching portion has a plurality of sign portions being distinguishable from each other and arranged on vertices of a tetrahedron of the teaching portion, respectively.

11. The robot teaching system according to claim 10, wherein
the plurality of sign portions have a plurality of light-emitting elements arranged on the vertices of the tetrahedron, respectively, and
the control portion is configured to sequentially emit light from the plurality of light-emitting elements of the teaching portion and measure the positions and postures of the teaching tool in the teaching positions taught by the teaching portion with the measuring portion.

12. The robot teaching system according to claim 11, wherein
the plurality of light-emitting elements of the teaching portion have light diffusion caps mounted thereon.

13. The robot teaching system according to claim 11, wherein
the plurality of light-emitting elements are configured to output infrared light, and
the measuring portion is configured to receive the infrared light output from the plurality of light-emitting elements to measure the positions and postures of the teaching tool in the teaching positions specified by the teaching tool.

14. The robot teaching system according to claim 10, wherein
the teaching portion has a regular tetrahedral shape.

15. The robot teaching system according to claim 10, wherein
the grasp portion of the teaching tool is formed in a tool shape appropriate for an operation performed by the robot.

16. A robot teaching method comprising:
specifying teaching positions as operating positions of a robot on the basis of that a user operates an operation portion of a teaching tool in a state where the teaching tool is located in the teaching positions;
measuring positions and postures of the teaching tool in the teaching positions specified by the teaching tool; and
generating a teaching program for the robot by determining the teaching positions for the robot on the basis of the measured positions and postures of the teaching tool,
wherein specifying the teaching positions includes specifying the teaching positions continuously while the user operates the operation portion, moving the teaching tool, and
wherein measuring the positions and postures of the teaching tool includes imaging the teaching tool in the teaching positions specified by the teaching tool and computing the positions and postures of the teaching tool on the basis of an imaging result, the postures being respective orientations of the teaching tool at the positions.

17. The robot teaching method according to claim 16, wherein
specifying the teaching positions includes switching between a mode of specifying the teaching positions and a mode of specifying the teaching positions continuously while the teaching tool moves on the basis of an operation performed by the user on the operation portion.

18. A robot teaching method comprising:
specifying teaching positions as operating positions of a robot on the basis of that a user operates an operation portion of a teaching tool in a state where the teaching tool is located in the teaching positions;
measuring positions and postures of the teaching tool in the teaching positions specified by the teaching tool, the postures being respective orientations of the teaching tool at the positions;
generating a teaching program for the robot by determining the teaching positions for the robot on the basis of the measured positions and postures of the teaching tool;
determining whether or not the robot is movable to positions and postures corresponding to the positions and postures of the teaching tool; and
notifying the user of a result of determination whether or not the robot is movable to the positions and the postures corresponding to the positions and postures of the teaching tool with a notification portion of the teaching tool,
wherein specifying the teaching positions includes specifying the teaching positions continuously while the user operates the operation portion, moving the teaching tool.

19. The robot teaching system according to claim 1, wherein the measuring portion is configured to measure three-dimensional positions and three-dimensional postures of the teaching tool in the teaching positions specified by the teaching tool, the control portion being configured to determine the teaching positions for the robot on the basis of the three-dimensional positions and the three-dimensional postures of the teaching tool measured by the measuring portion.

* * * * *